United States Patent [19]

Takahashi

[11] E Re. 31,001

[45] Reissued Jul. 27, 1982

[54] DAMPER ASSEMBLY OF PIANOS

[75] Inventor: Hiroyoshi Takahashi, Hamamatsu, Japan

[73] Assignee: Nippon Gakki Seizo Kabushiki Kaisha, Japan

[21] Appl. No.: 172,564

[22] Filed: Jul. 28, 1980

Related U.S. Patent Documents

Reissue of:

[64] Patent No.: 4,203,341
Issued: May 20, 1980
Appl. No.: 897,404
Filed: Apr. 18, 1978

[30] Foreign Application Priority Data

Apr. 26, 1977 [JP] Japan ..... 52-52181[U]

[51] Int. Cl.[3] ..... G10C 3/22
[52] U.S. Cl. ..... 84/255
[58] Field of Search ..... 84/174, 216–218, 84/234, 236–239, 243–255

[56] References Cited

U.S. PATENT DOCUMENTS

| | | | |
|---|---|---|---|
| 43,524 | 7/1864 | Pistorius | 84/237 |
| 164,052 | 6/1875 | Steinway | 84/237 |
| 629,362 | 7/1899 | Herrburger | 84/239 |
| 762,864 | 6/1904 | Earthy | 84/249 |
| 900,305 | 10/1908 | Perry | 84/236 |

FOREIGN PATENT DOCUMENTS

| | | | |
|---|---|---|---|
| 10690 | of 1886 | United Kingdom | 84/255 |

*Primary Examiner*—Lawrence R. Franklin
*Attorney, Agent, or Firm*—Ostrolenk, Faber, Gerb & Soffen

[57] ABSTRACT

In the construction of a damper assembly of pianos, the conventionally used long-sized damper wire is replaced by a pair of separate short-sized lever components operationally related to each other via an additional intermediate damper lever for stabilized action of the assembly even without provision of the conventionally used guide rail. A shorter length damper wire joins the upper lever component to the damper head.

4 Claims, 3 Drawing Figures

Fig. 1
PRIOR ART
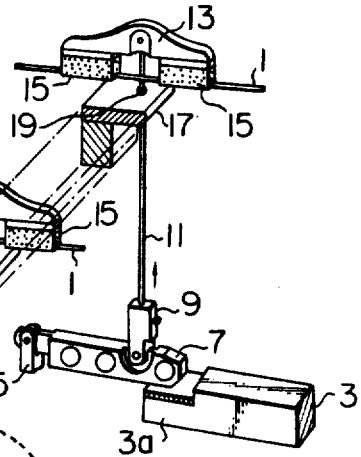
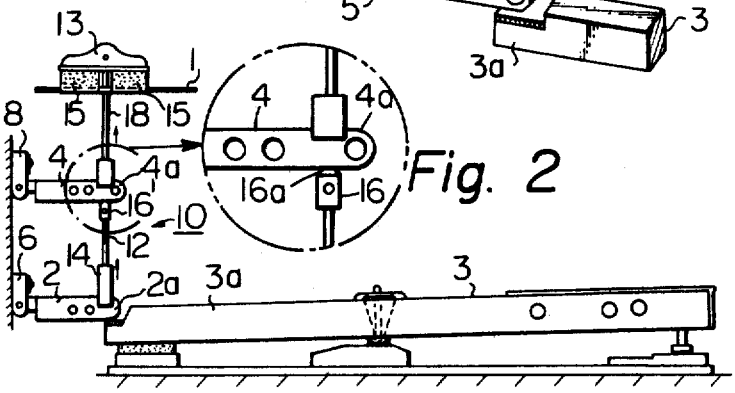
Fig. 2
Fig. 3
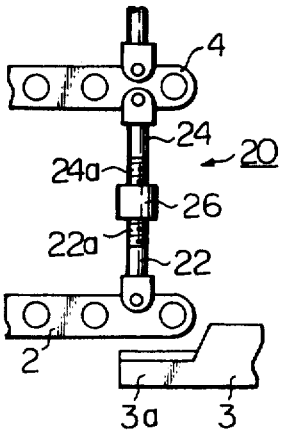

DAMPER ASSEMBLY OF PIANOS

Matter enclosed in heavy brackets [ ] appears in the original patent but forms no part of this reissue specification; matter printed in italics indicates the additions made by reissue.

BACKGROUND OF THE INVENTION

The present invention relates to an improved damper assembly of pianos.

In the construction of a piano, each string is accompanied by each damper assembly and all damper assemblies operate quite independently of each other but in a synchronized fashion. When the playing key is not depressed, the damper head of the assembly presses the associated string via a damper felt and, upon depression of the key, the damper head moves away from the string in order to enable it to freely vibrate. Action of the damper head is caused by finger operation on the associated key which is mounted swingably to a given fixed support. The rear end portion of the key is operationally related to the damper head via a relatively long damper wire which, following the swinging of the key, reciprocates in the longitudinal direction thereof. This reciprocal movement of the damper wire tends to be accompanied by undesirable swinging and tossing thereof due to its relatively great length, which adversely influences tones generated by the piano.

In order to restrict such undesirable swinging and tossing of the damper wires, an elongated guide rail generally made of a wooden material is arranged across the running direction of the strings and is provided with a number of small holes through which the damper wires idly extend. Use of such a guide rail requires long term seasoning, which greatly lowers productivity, in order to avoid warp and distorsion. In addition formation of numerous small holes requires time- and labor-consuming operation and highly skilled technique.

SUMMARY OF THE INVENTION

It is one object of the present invention to provide a damper assembly which is quite free from bad influence conventionally caused by uncontrolled swinging and tossing of the long damper wire.

It is another object of the present invention to provide a damper assembly which can be manufactured with high productivity.

It is the other object of the present invention to provide a damper assembly which enables free and easy adjustment of pressure applied to strings by associated damper heads.

In accordance with the present invention, the conventionally used long damper wire is replaced by a linking element which is comprised of a pair of relatively short separate rod components operationally related to each other via an additional intermediate damper lever. Advantageously, the linking element is adjustable in the effective length thereof.

BRIEF DESCRIPTION OF DRAWINGS

FIG. 1 is a perspective view of the conventional damper assembly accompanied by the key, FIG. 2 is a side view of one embodiment of the damper assembly in accordance with the present invention accompanied by the key assembly, and FIG. 3 is a fragmentary side view of another embodiment of the damper assembly in accordance with the present invention.

DESCRIPTION OF PREFERRED EMBODIMENT

A typical construction of a conventional damper assembly associated with a key (a fragmental part thereof being shown) is shown in FIG. 1. Components unrelated to the later described construction in accordance with the present invention are omitted for purposes of simplification. A damper lever 7 is pivoted at one thereof extending over the rear end portion 3a of a key 3. A vertically extending damper wire 11 is coupled at the lower end thereof to the damper lever 7 via a damper block 9 pivoted to the damper lever 7. The wire 11 holds at its top thereof a damper head 13 accompanied by a damper felt 15 bonded to the bottom face thereof. A damper head 13 is provided for each string 1 at a position over the rear end portion 3a of the corresponding key 3.

When the key 3 is not depressed, the damper head 13 rests on the string 1 via the damper felt 15 due to their own weights in order to restrain unnecessary vibration of the string. When the key 3 is depressed, the rear end portion 3a of the key lifts the damper lever 7 so that the damper head 13 with the damper felt 15 rises upwardly off the string 1 being pushed up via the damper wire 11 in order to allow vibration of the string 1.

Since the damper wire 11 has a length in a range from 12 to 13 cm and a weight component, i.e. the damper head 13 with the damper felt 15, is mounted atop this relatively long and thin damper wire 11, the damper wire 11 is liable to swing laterally during playing of the piano and to vertically toss when returning to the lower position. In order to avoid bad influences caused by such swinging and tossing of the damper wire 11, a horizontal guide rail 17 fixed to a guide rail base 21 is provided. It extends in a direction almost perpendicular to the running direction of the strings 1 over almost the total width of the entire keys 3. At positions corresponding to those of damper wires 11 for respective keys 3, small holes are formed through the thickness dimension of the guide rail 17 through which the damper wires 11 idly extend via respective guide rail bushings 19. In other words, the damper wires 11 are slidably upheld by the guide rail 17 while being prevented from the above-described undersirable swinging and tossing.

Thus, the guide rail 17 is provided with a great number of small holes formed through the thickness dimension thereof. Manufacturing of such guide rail 17 is seriously time- and labor consuming. As the guide rail 17 is in general made of wooden materials, it tends to develop undersirable warp and distorsion following changes in the surrounding conditions such as humidity and temperature. In order to obviate such troubles, it is necessary to subject the product to a lone term seasoning process which ends in low productivity. In addition, correct positioning of the holes along the entire length of the guide rail 17 requires considerably time-consuming and complicated work. Insertion and fixing of the guide rail bushings 19 in numerous small holes also requires complicated tedious work and highly skilled technique.

An embodiment of the damper assembly in accordance with the present invention is shown in FIG. 2, in which components substantially similar to those used in the above-mentioned construction are designated with similar reference numerals.

Like the conventional construction, the damper assembly in accordance with the present invention is located rearwardly and upwardly of the key assembly, i.e. rearwardly of the rear end portion 3a of the key 3. The damper assembly is provided with a pair of upper and lower damper levers 4 and 2 which are pivoted to associated fixedly positioned damper lever flanges 8 and 6, respectively. The free end 2a of the lower damper lever 2 rests on the rear end portion 3a of the key 3 whereas the free end 4a of the upper damper lever 4 fixedly supports the bottom end of the damper wire 18 for the damper head 13.

A linking element 10 is interposed between the upper and lower damper levers 4 and 2 and is comprised of a vertical linking rod 12 threaded at the top end portion, a damper block 14 securely connecting the bottom end of the linking rod 12 to the free end 2a of the lower damper lever 2, and a cap 16 screwed atop the linking rod 12 in order to support the free end 4a of the upper damper lever 4. As shown in the enlarged fragment of FIG. 2, the top of the cap 16 is rounded at 16a. This provides the surface by which the cap 16 supports the free end 4a of the upper damper lever 4. because the damper levers 2 and 4 pivot, and because the damper block 14 holds the linking rod 12 non-pivotally to the lower damper lever 2, the rounded top 16a of the cap 16 enables the linking rod 12 to pivot with respect to the upper damper lever 4 as the linking rod 12 is upraised by the lower damper lever 2. As a result, there is a pivoting connection between the cap 16 and the upper damper lever 4.

When the key 3 is depressed with the above-described construction of the damper assembly, the free end 2a of the lower damper lever 2 is accordingly pushed up and, via the linking rod 12 and the cap 16, the free end 4a of the upper damper lever 4 is pushed up also. This swinging of the upper damper lever 4 makes the damper head 13 with the damper felt 15 rise upwardly off the string 1 in order to enable vibration of the string 1.

In the case of the present invention, the long damper wire used in the conventional construction is replaced by two relatively small sized components, i.e. the damper wire 18 and the linking rod 12 operationally related to each other, via the upper damper lever 4. Thus, the length of the damper wire 18 used in the present invention is shortened to about a half of that of the damper wire 11 used in the conventional construction and this reduced length of the damper wire 18 effectively prevents undesirable swinging thereof, resulting in remarkably slashed uncontrolled action of the damper felt 15 during playing of the piano. Thanks to this stabilized action of the damper wire 18, it is possible to omit the guide rail 17 used in the conventional construction.

In addition to the above-described advantage, the effective distance between the upper and lower damper levers 4 and 2 is freely changeable by adjusting the screw engagement between the cap 16 and the linking rod 12. In other words, pressure on the string 1 by the damper felt 15 is freely adjustable by adjusting the above-described screw engagement.

A modified embodiment of the damper assembly in accordance with the present invention is shown in FIG. 3, in which the upper and lower damper levers 4 and 2 are linked to each other by a different type of linking element 20 which comprises a lower rod 22 pivoted to the lower damper lever 2 and provided with a right-handed screw 22a on the top portion thereof, an upper rod 24 pivoted to the upper damper lever 4 and provided with a left-handed screw 24a on the bottom portion thereof and an adjuster nut 26 in screw engagement with the screws 22a and 24a. It will be well understood that the distance between the upper and lower damper levers 4 and 2 can be freely and quite easily changed by manually turning the adjuster nut 26.

In the case of this embodiment, the free end 2a of the lower damper lever 2 can be upheld apart from the rear end portion 3a of the key 3. Therefore, the key 3 is free of load by the damper assembly when the key is not played.

In a variant of this embodiment, a left-handed screw may be formed on the lower rod 22 with a right-handed screw being formed on the upper rod 24.

Although the foregoing description refers to application of the invention to grand-type non-electric pianos, it will be well understood that the present invention is advantageously applicable to grand-type electric pianos also through introduction of minor modification obvious to those skilled in the art.

Due to the omission of the guide rail used in the prior art, it is no longer necessary to form small holes in the guide rail for stable support of the long damper wire which, as described already, requires considerably time-consuming and tedious work and highly skilled technique. In addition, the free adjustment of the distance between the pair of damper levers enables easy adjustment of the pressure to be imposed on the strings by the damper felts.

I claim:

1. An improved damper assembly of pianos comprising:

a lower lever having one end pivoted to a fixed support and having a free end operationally related to the rear end portion of an associated key, such that motion of the key causes the rear end portion thereof to pivot said lower lever; an upper damper lever having a respective one end pivoted to a fixed support and being spaced from and arranged over said lower damper lever;

a motion transmitting damper wire carried at the bottom end thereof by the free end of said upper damper lever, said damper wire being relatively short and fixedly connected with said upper damper lever so that said damper wire is raised and lowered by said upper damper lever; and as it is raised and lowered, said damper wire also maintains the same tilt orientation as said upper damper lever as said upper damper lever pivots, an upwardly held damper head raisable off and lowerable onto an associated string for respectively permitting and damping vibration of that string, and said damper wire at the upper end thereof holding said damper head for movement to raise and lower said damper head as said damper wire is raised and lowered, respectively, and a linking element interposed between said upper and lower damper levers for linking said levers to pivot together, said linking element being fixedly connected to said lower lever at one end thereof and having a rounded cap at the other end thereof, the free end of said upper damper lever resting on and supported by said rounded cap, whereby said linking element does not move rigidly with the said upper damper lever with respect to which said linking element is pivotable.

2. In combination, the damper assembly of claim 1, and a key for operating the damper assembly, said key having an operable front portion and rear end portion, said key being supported, with its said front and rear end portions being on opposite sides of said pivot support thereof, and said key being oriented such that operation thereof pivots said key to pivot said lower lever.

3. An improved damper assembly as claimed in claim 1 in which said linking element is provided with a threaded top portion, and said cap being screwed over said threaded top portion of said linking element.

*4. An improved damper assembly of pianos comprising:*

*a lower lever having one end pivoted to a fixed support and having a free end operationally related to the rear end portion of an associated key, such that motion of the key causes the rear end portion thereof to pivot said lower lever; an upper damper lever having a respective one end pivoted to a fixed support and being spaced from and arranged over said lower damper lever;*

*a motion transmitting damper wire carried at the bottom end thereof by the free end of said upper damper lever,*

*said damper wire being relatively short and fixedly connected with said upper damper lever so that said damper wire is raised and lowered by said upper damper lever; and as it is raised and lowered, said damper wire also maintains the same tilt orientation as said upper damper lever as said upper damper lever pivots; an upwardly held damper head raisable off and lowerable onto an associated string for respectively permitting and damping vibration of that string, and said damper wire at the upper end thereof holding said damper head for movement to raise and lower said damper head as said damper wire is raised and lowered, respectively, and*

*a linking element interposed between said upper and lower damper levers for linking said levers to pivot together, said linking element being fixedly connected to said lower lever at one end thereof and having a supporting part at the other end thereof, the free end of said upper damper lever resting on and supported by said supported part, whereby said linking element does not move rigidly with the said upper damper lever with respect to which said linking element is pivotable.*

* * * * *